United States Patent [19]
Wolf et al.

[11] Patent Number: 5,954,087
[45] Date of Patent: Sep. 21, 1999

[54] FLUID COLLECTION SYSTEM IN FACILITY FOR STORING PARTS

[75] Inventors: Joseph P. Wolf, Fort Loramie; Thomas J. Wente, New Bremen; Theodore T. Nagel, Maria Stein, all of Ohio

[73] Assignee: Precision Strip, Inc., Minster, Ohio

[21] Appl. No.: 09/056,977

[22] Filed: Apr. 8, 1998

[51] Int. Cl.⁶ .................................................. F16N 31/00
[52] U.S. Cl. .............................. 137/312; 137/1; 137/362; 141/1; 141/86; 141/106; 52/169.7; 52/302.3
[58] Field of Search .................................. 141/1, 86, 106; 137/1, 312, 362, 602; 184/106; 222/108; 52/169.4, 169.5, 169.7, 169.8, 302.3; 220/571, 572; 108/24, 57.16, 57.17, 57.21, 57.22

[56] References Cited

U.S. PATENT DOCUMENTS

| | | | |
|---|---|---|---|
| 349,735 | 9/1886 | Nicaise | 137/362 |
| 1,507,628 | 9/1924 | Schuyler | 137/312 |
| 1,797,671 | 3/1931 | Page . | |
| 3,803,777 | 4/1974 | Stewart | 52/11 |
| 3,990,469 | 11/1976 | Ralston | 137/362 |
| 4,246,982 | 1/1981 | Pretnick | 184/106 |
| 4,679,590 | 7/1987 | Hergenroeder | 137/602 |
| 4,843,975 | 7/1989 | Welsch | 108/24 |
| 5,105,485 | 4/1992 | Sciabarassi | 108/24 |
| 5,199,457 | 4/1993 | Miller | 137/312 |
| 5,249,699 | 10/1993 | Williams | 220/571 |
| 5,291,921 | 3/1994 | Devine | 141/86 |
| 5,437,303 | 8/1995 | Johnson | 137/312 |
| 5,562,047 | 10/1996 | Forney et al. | 220/571 |
| 5,577,539 | 11/1996 | Shaw et al. | 141/106 |
| 5,645,103 | 7/1997 | Whittaker | 137/312 |
| 5,810,511 | 9/1998 | Schmidt | 52/169.7 |

*Primary Examiner*—J. Casimer Jacyna
*Attorney, Agent, or Firm*—Wood, Herron & Evans, L.L.P.

[57] ABSTRACT

There is provided a system for collecting fluids, such as lubricating oil, in a facility for storing parts, such as lubricated metal coils, wherein fluid is directed away from the stored parts to a location where the fluid may be easily collected without interruption of facility operations, and thus rendering frequent or regular cleanup of the floor of the storage area unnecessary. To this end, the storage facility is equipped with a trough on at least one side of a bay adapted for holding the parts. The bay is further equipped with a plurality of channels for collecting fluid leaking from the parts. The channels are sloped toward at least one trough such that the fluid collected in the channels flows into the troughs. A reservoir is optionally located at one or both ends of each trough for collecting the liquid, and the reservoirs may be periodically emptied to discard the collected fluid. In a further feature of the present invention, one or more pads of a width less than the width of the channel are located in each channel for receiving and protecting the surface of the parts.

33 Claims, 4 Drawing Sheets

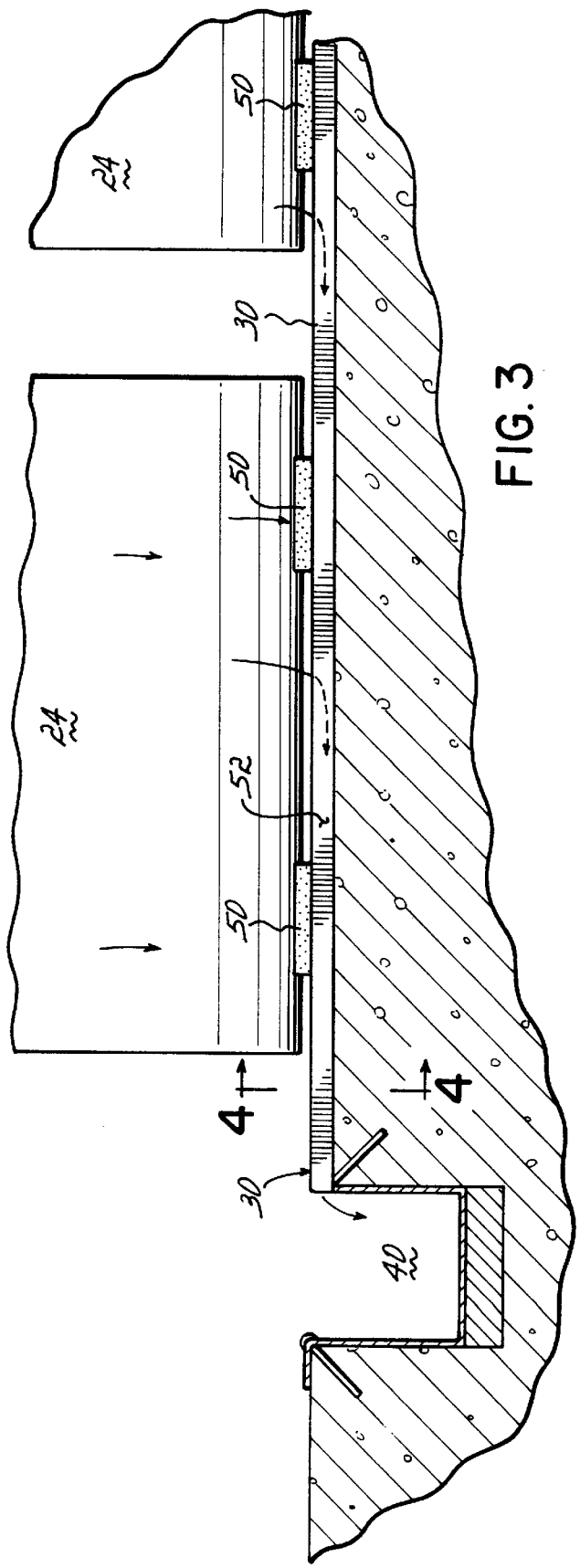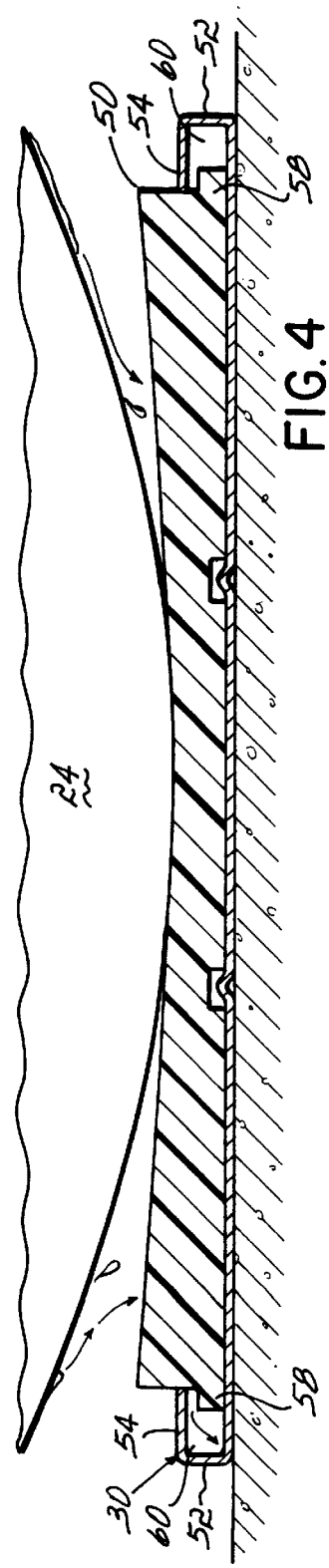

FLUID COLLECTION SYSTEM IN FACILITY FOR STORING PARTS

FIELD OF THE INVENTION

This invention relates generally to liquid collection systems, and more particularly to a liquid collection system for a storage facility.

BACKGROUND OF THE INVENTION

In the course of manufacturing sheet metal coils, such as steel coils, the sheet metal is coated with lubricating and rust inhibitive oil prior to winding into coils. The coils are then generally moved to a storage facility until arrangements are made for shipment of the coils to the customer or to the next processor of the sheet metal coil.

While a coil is sitting in the storage facility, which may be for a duration of only hours or for several weeks, the coil weeps or leaks oil, which collects on the floor of the storage facility. This creates a dangerous condition for persons working in the area, including those persons responsible for cleaning the floor or for operating the cranes that lift and transport the coils in and out of the facility.

To contend with this oil leakage, there have been attempts to locate collection pans beneath the coils in the storage facility. This system requires, however, that someone regularly collect, empty and clean the pans. Another attempt to solve the problem has been the placement of moisture collection pads beneath the stored coils. These too must be periodically removed and replaced.

Recently, metal coil storage facilities have been developed which utilize completely automated cranes for moving the metal coils within the storage facility. In such facilities, which are oftentimes about the size of a football field, overhead cranes normally receive the incoming coils and move them to a selected storage site. When those coils are to be transferred out of the storage facility, the crane retrieves them and moves them to various exit points for loading onto trucks and railcars. Oil leakage in such facilities is particularly troublesome because the stored coils are preferably positioned so closely together that there is no room for a cleanup person and his equipment to move between the coils. Furthermore, because the facility is completely computer controlled, it must be completely shut down in order to clean up the collected oil on the floor of the facility.

There is thus a need to develop a system for removal of oil leaking from stored metal coils that does not require personnel to enter the storage area and does not require shut-down of the facility.

SUMMARY OF THE INVENTION

The present invention provides a system for collecting fluids in a facility for storing parts, such as a facility for storing metal coils lubricated with oil, such that frequent or regular cleanup of the floor of the storage area is rendered unnecessary. To this end, the facility is equipped with a trough along the side of the lower surface of a bay adapted for storing the parts. The lower surface of the bay is further equipped with a plurality of channels for collecting fluid leaking from the parts. The channels are preferably perpendicular to the trough and intersect therewith. The channels are sloped downwardly toward the trough such that the fluid collected in the channels flows into the trough.

In a further feature of the present invention, a trough extends along each of opposing sides of the bay and a plurality of channels slope downwardly from points intermediate the sides of the bay and terminate at the sides of the bay such that fluid runs down the channels and into the two troughs. A reservoir is optionally located at one or both ends of each trough for collecting the liquid, and the reservoirs may be periodically pumped to discard of the collected fluid.

In a still further feature of the present invention, one or more pads are located in each channel for receiving the parts and for protecting the surface of the parts from damage. Each pad advantageously has a width less than the width of the channel such that fluid may flow around the pad to the troughs.

There is thus provided a system for fluid collection in a storage facility that directs fluid away from the stored parts to a location where the fluid may be easily collected without interruption of facility operations. These and other advantages of the present invention shall become more apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

FIG. 3 is an enlarged view of the encircled area 3 of FIG. 2;

FIG. 4 is a cross-sectional view taken along line 4—4 of FIG. 3; and

DETAILED DESCRIPTION

Figure 1:
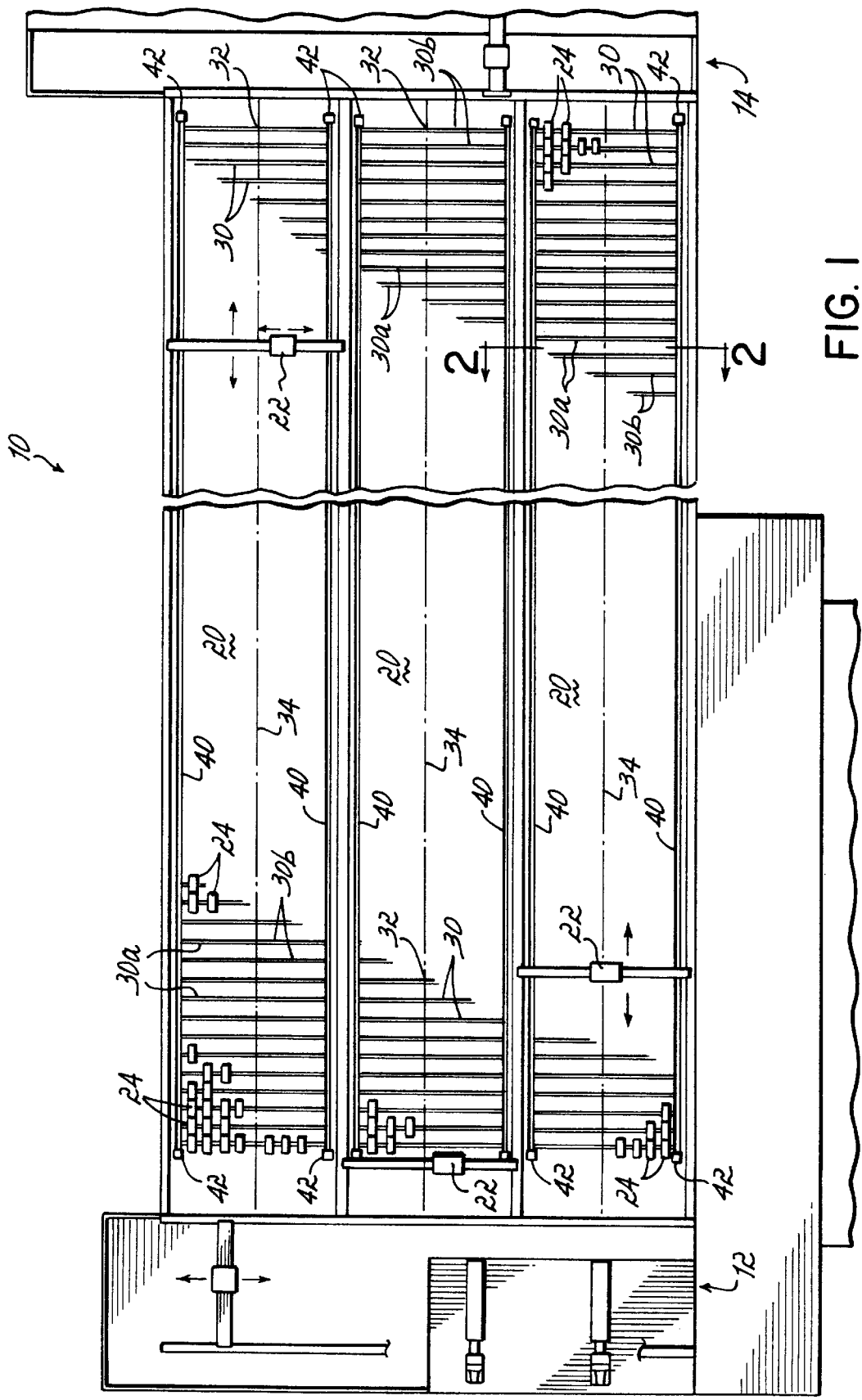
FIG. 1 is a top plan view of a storage facility of the present invention having three longitudinally extending bays.

Throughout the description of the present invention, identical reference numerals will be used in each drawing to refer to same or similar features. With reference to FIG. 1, a typical storage facility 10 has a loading area 12 and an unloading area 14. In the present invention, one or more bays 20 are provided in the facility 10 between the loading area 12 and the unloading area 14. FIG. 1 shows a storage facility 10 having three such bays 20. In automated storage facilities, a movable crane 22 is normally located in each bay 20 for lifting and transporting the parts 24 stored on the lower surface of the bay 20, as shown more clearly in FIG. 2. The crane 22 may be movable in both the longitudinal and transverse directions to allow storage of multiple parts 24 in both rows and columns within each bay 20.

Again referring to FIG. 1, in each bay 20, there are a series of channels 30 extending across the full width of the bay 20. The channels 30 are of sufficient depth to collect fluids that may leak or drip from the stored parts 24, such as lubricating oil dripping from steel coils. To this end, each channel 30 has a depth of at least about 0.5 inch, and is advantageously about 1.0 inch in depth. The width of the channels 30 should be sufficient to catch the fluid dripping from the parts 24. The shape of the part will partially determine at what point the liquid will drop to the floor. By way of example, for a 90 inch outside diameter steel coil, the channels 30 should have about an 18 inch width. The channels 30 of the present invention slope toward at least one outer edge of the bay 20

Figure 2:
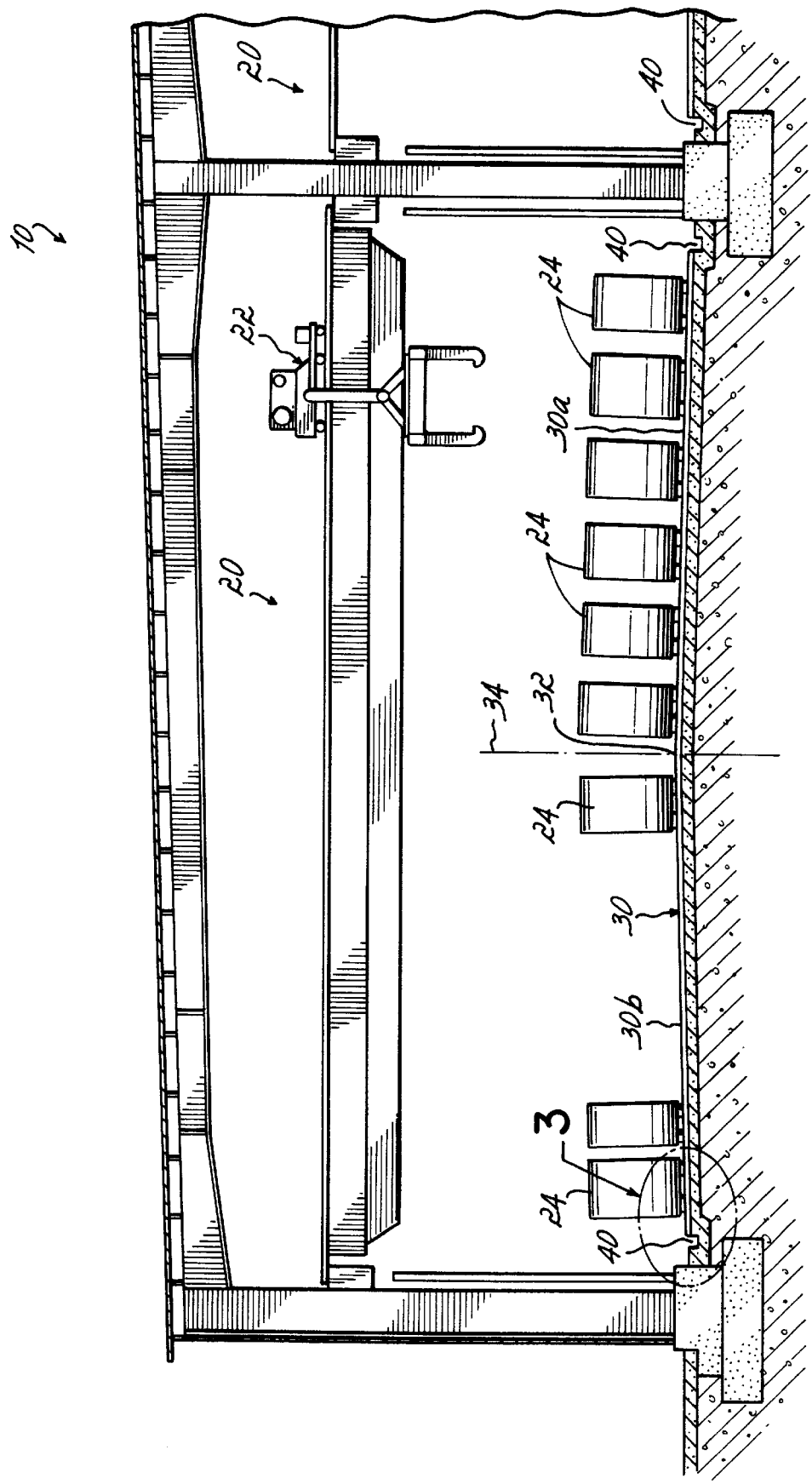
FIG. 2 is a cross-sectional view taken along line 2—2 of FIG. 1.

(FIG. 2). For practical reasons, the channels 30 should have a pitch such that gravity draws the fluid downward, but not so steep that the parts 24 slide. By way of example, for 90 inch outside diameter steel coils, a range of pitch of about 0.75 inch to about 1.5 inch for every 25 feet of the channel 30 is suitable, with 1 inch for every 25 feet being preferred.

The channels 30 of the present invention may slope from one side of the bay 20 down to the opposing side. In a preferred embodiment of the present invention shown in FIGS. 1 and 2, two sets of channels 30a, 30b meet at a common point 32 intermediate the sides of the bay such that one set of channels 30a slopes downwardly toward one side of the bay 20 and the other set of channels 30b slopes downwardly toward the other side of the bay 20. Point 32 is advantageously located at the longitudinal centerline 34 of the bay 20 so as to minimize the necessary pitch, as depicted in FIGS. 1 and 2. It should be appreciated, however, that the point 32 may be located at any intermediate point between the sides of the bay 20. It may also be appreciated that the two sets of channels 30a, 30b may meet or terminate at two distinct points, both points being intermediate the sides of the bay. The sloped channels 30 enable fluid that drips from the parts 24 to collect in the channels 30 and run down to the sides of the bay 20, rather than collecting on the bay floor around the parts 24.

In a preferred embodiment of the present invention, the channels 30 are formed by placing a series of roll-formed steel channels 30a, 30b in a spaced apart fashion along the length of the bay 20 and directed toward the sides of the bay. The spacing between the channels 30 is dependant on the size of the parts 24 being stored. The series of channels 30a, 30b are placed on each side of a sloped floor having an apex at an intermediate point normally the longitudinal centerline 34 of the bay 20. Each channel 30a on one side of the apex is joined at its end, such as by welding, to an adjacent end of a channel 30b on the other side of the apex, such that the fluid runs downward from the apex to the lower ends of the channels 30a, 30b. The channels 30 may be fastened to the floor, or simply placed there relying on the weight of the parts to prevent shifting of the channels.

Referring again to FIG. 1, each bay 20 has at least one trough 40 that extends along the side of the bay 20, preferably a longitudinal side, and normally along the full length of the bay 20. The trough 40 collects fluid that runs down the sloped channels 30, as best shown in FIGS. 1–3. To this end, the trough 40 is of sufficient depth for collecting fluid entering the trough 40 from a plurality of channels 30. Advantageously, the trough 40 is at least about 4 inches in depth, and more advantageously about 6 to 8 inches in depth. In an embodiment in which channels 30 slope from approximately one side of bay 20 to the opposing side, only one trough 40 is necessary. In the preferred embodiment of the present invention shown in FIGS. 1 and 2 in which the channels 30a, 30b slope downward from a common intermediate point 32, preferably located at the longitudinal centerline 34, each side of the bay 20 will terminate in a trough 40 for collecting the fluid from the channels 30, which intersect with the troughs 40. Troughs 40 on each side of bay 20 would also be needed in the alternative embodiment in which the channels 30a, 30b slope downward from two distinct intermediate points such that the channels 30a, 30b are not joined in the middle of the bay 20.

Again referring to FIG. 1, at one or both ends of each trough 40 is an optional reservoir 42, or sump, within which the fluid collects. The fluid may be periodically collected or pumped, such as by a sump pump (not shown). Alternatively, the fluid may be pumped directly from the troughs 40.

Figure 5:
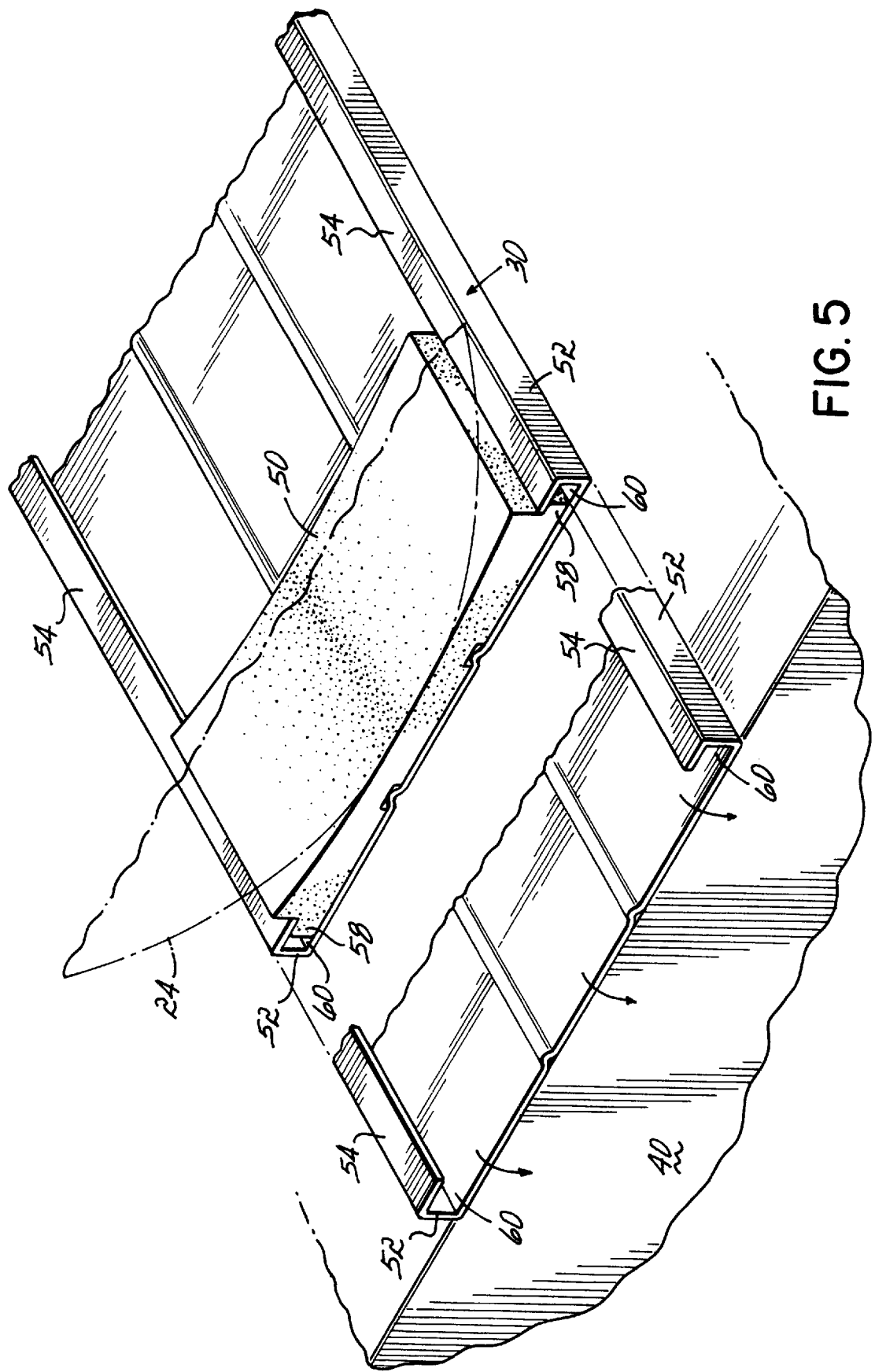
FIG. 5 is a perspective view of a channel of the present invention.

Referring now to FIGS. 3–5, within each transverse channel 30, there are located one or more pads 50 upon which the parts 24 are placed during storage. The pads 50 are advantageously made from a material suitable for protecting the surface quality of the parts 24 to be stored. For example, in the storage of lubricated steel coils, a (poly)urethane pad may be used. The material for the pads should also be capable of withstanding the weight and temperature of the parts when they are received. For example, the (poly) urethane pads are acceptable for protecting steel coils, which may be received by the storage facility with temperatures as high as around 150° F. The material is also advantageously non-absorbing, such that frequent replacement of the pads is unnecessary.

A plurality of pads 50 may be placed along the length of the channel 30 for storing multiple parts 24 in a row in each channel 30. Alternatively, a single pad 50 having a length approximately equal to the length of the channel 30 may be used, although this may make replacement of worn or damaged pads more difficult, and may be more costly than the smaller pads. In any embodiment, the width of the pads 50 should be less than the width of the channel 30 such that fluid is capable of flowing past the pads 50 to the outer edge of the bay 20 and into the trough 40, as shown in FIGS. 4 and 5.

In a preferred embodiment of the present invention, as depicted in FIGS. 4 and 5, the side walls 52 of the channels 30 may each have an inwardly extending flange 54 and the pads 50 may have tabs 58 on each side such that a tab 58 may be inserted into a portion of the recess 60 created by a side wall 52 and a flange 54 to loosely secure the pad 50 in the channel 30, while still allowing fluid to pass through the recess 60 of the channel 30 to the trough 40. This configuration allows the pads to be held in place during use, while being easily removed when replacement is necessary. This also allows the pads to slide in the channel to reposition the pads for various part widths.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. For example, although the art has been described in the context of lubricated steel coil storage facilities, the present invention is applicable to the storage of any parts in which fluid leakage is a problem. Furthermore, the size and depth of the various features of the present invention may vary depending the size of the facility and the size of the parts being stored. In a preferred embodiment of the present invention, the floor of the bay is described as being sloped, with flat channels placed thereon. It may be appreciated that a flat floor with channels having a wedge-shaped bottom may also provide the desired slope. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A system for collecting fluid in a facility for storing parts dripping the fluid, said system comprising:
   a storage facility having at least one bay with a lower surface;
   a trough along a side of the lower surface of the bay;
   a first plurality of channels in the lower surface extending across the lower surface non-parallel to the trough and sloping downwardly to intersect the trough; and at least one pad in each channel adapted to receive a part, whereby fluid dripping from the parts is collected in the channels and drains down the channels into the trough.

2. The system of claim 1, wherein the trough is about 4 to about 10 inches deep.

3. The system of claim 1, wherein the trough extends along a longitudinal side of the lower surface of the bay.

4. The system of claim 1, wherein two troughs extend along opposing sides of the lower surface of the bay.

5. The system of claim 4, wherein the two troughs extend along opposing longitudinal sides of the lower surface of the bay.

6. The system of claim 4, wherein the first plurality of channels extend across the lower surface, slope downward from a first point intermediate the sides of the lower surface and intersect one of the troughs; and a second plurality of channels extend across the lower surface, slope downward from a second point intermediate the sides of the lower surface and intersect the other of the troughs.

7. The system of claim 6, wherein the first point and the second point are the same.

8. The system of claim 7, wherein the points lie on a longitudinal centerline of the bay.

9. The system of claim 6, wherein the channels are generally perpendicular to the troughs.

10. The system of claim 1, wherein each channel has a depth of about 0.5 to about 2 inches.

11. The system of claim 1, wherein each channel has a pitch in the range of about 0.75 inch to about 1.5 inches for every 25 feet.

12. The system of claim 1, wherein the channels are generally perpendicular to the trough.

13. The system of claim 1, wherein the pads have a width less than the width of the channel.

14. The system of claim 1, wherein the pads include urethane.

15. The system of claim 1, wherein there are a plurality of pads in each channel.

16. The system of claim 1, wherein there is a reservoir at one end of each trough.

17. The system of claim 1, wherein there is a reservoir at each end of each trough.

18. A system for collecting fluid in a facility for storing parts dripping the fluid, said system comprising:
    a storage facility having at least one bay with a lower surface;
    a trough extending along each of opposing longitudinal sides of the lower surface of the bay;
    a first plurality of channels in the lower surface extending across the lower surface non-parallel to the troughs and sloping downwardly from a first point intermediate the sides of the lower surface to intersect one of the troughs; and a second plurality of channels in the lower surface extending across the lower surface non-parallel to the troughs and sloping downwardly from a second point intermediate the sides of the lower surface to intersect the other of the troughs;
    at least one pad in each channel having a width less than the width of the channel and adapted to receive one or more parts, whereby fluid dripping from the parts is collected in the channels and drains down the channels into the troughs.

19. The system of claim 18, wherein the troughs are about 4 to about 10 inches deep.

20. The system of claim 18, wherein each channel has a depth of about 0.5 to about 2 inches.

21. The system of claim 18, wherein each channel has a pitch in the range of about 0.75 inch to about 1.5 inches for every 25 feet.

22. The system of claim 18, wherein the pads include urethane.

23. The system of claim 18, wherein there is a reservoir at one end of each trough.

24. The system of claim 18, wherein there is a reservoir at each end of each trough.

25. A system for collecting oil in a facility storing lubricated metal coils having the oil dripping therefrom, comprising:
    a storage facility having at least one bay with a lower surface;
    first and second troughs extending along opposite longitudinal sides of the lower surface of the bay;
    a plurality of first channels extending across the lower surface non-parallel to the first trough, each of the plurality of first channels having a first end located at a longitudinal centerline of the bay and sloping downward to a second end intersecting the first trough;
    a plurality of second channels extending across the lower surface non-parallel to the second trough, each of the plurality of second channels having a first end located at the longitudinal centerline of the bay and sloping downward to a second end intersecting the second trough;
    a plurality of pads disposed in the first and second channels, each pad adapted to receive one of the coils; and
    first and second reservoirs disposed with respect to the respective first and second troughs, whereby fluid dripping from the coils into the first and second channels, drains down the first and second channels into the respective first and second troughs and then drains into respective first and second reservoirs.

26. The system of claim 25, wherein the troughs are about 4 to about 10 inches deep.

27. The system of claim 25, wherein each channel has a depth of about 0.5 to about 2 inches.

28. The system of claim 25, wherein each channel has a pitch in the range of about 0.75 inch to about 1.5 inches for every 25 feet.

29. The system of claim 25, wherein the pads include urethane.

30. The system of claim 25, wherein the first end of each of the first channels is connected to a first end of one of the second channels.

31. The system of claim 25, wherein there is a reservoir at each end of each trough.

32. A method for collecting fluid in a facility for storing parts dripping the fluid, said method comprising the steps of:
    providing a trough extending along one side of a floor of the facility;
    placing at least one channel on the floor of the facility so that one end of the channel is higher than an opposite end, and the opposite end of the channel intersects the trough;
    placing at least one pad in the channel;
    placing a part dripping the fluid on the pad;
    collecting the fluid dripping from the part in the channel, the fluid flowing down the channel toward the opposite end of the channel; and
    collecting the fluid flowing down the channel in the trough.

33. A method for collecting fluid in a facility for storing parts dripping the fluid, said method comprising the steps of:
    providing first and second troughs extending along opposite sides of a floor of the facility;

placing first channels on the floor of the facility so that first ends of the first channels are located intermediate the opposite sides of the floor and are higher than opposite ends of the first channels, and the opposite ends of the first channels intersecting the first trough;

placing second channels on the floor of the facility so that first ends of the second channels are located intermediate the opposite sides of the floor and are higher than opposite ends of the second channels, and the opposite ends of the second channels intersecting the second trough;

placing a plurality of pads in the first and second channels;

placing a plurality of the parts on selected ones of the pads in the first and second channels;

collecting the fluid dripping from the parts in the first and second channels, the fluid flowing down the first and second channels toward the respective first and second troughs;

collecting the fluid flowing down the first channel in the first trough; and collecting the fluid flowing down the second channel in the second trough.

\* \* \* \* \*